US012560983B2

(12) United States Patent
Simpson et al.

(10) Patent No.: US 12,560,983 B2
(45) Date of Patent: Feb. 24, 2026

(54) HAPTIC TRACKPAD LOUDSPEAKER

(71) Applicant: Microsoft Technology Licensing, LLC, Redmond, WA (US)

(72) Inventors: Eric Simpson, Carnation, WA (US); Christian Lorenz, Redmond, WA (US); Nicolas Deforeit, Seattle, WA (US); Christopher Michael Forrester, Kirkland, WA (US); Alfonso Martinez, Duvall, WA (US); Chun Beng Goh, Bellevue, WA (US); Thomas Joseph Longo, Hopewell Junction, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/316,847

(22) Filed: May 12, 2023

(65) Prior Publication Data

US 2024/0377862 A1    Nov. 14, 2024

(51) Int. Cl.
*G06F 1/16*        (2006.01)
*G06F 3/01*        (2006.01)

(52) U.S. Cl.
CPC ............ *G06F 1/1688* (2013.01); *G06F 1/169* (2013.01); *G06F 3/016* (2013.01)

(58) Field of Classification Search
CPC ........ G06F 1/1688; G06F 1/169; G06F 3/016; G06F 1/1616; G06F 3/165; G06F 1/1662; G06F 3/0383; G06F 3/0219; G06F 3/0414; G06F 1/1686; G01L 5/167; H04R 1/00;

(Continued)

(56) References Cited

U.S. PATENT DOCUMENTS 10,088,947 B2 †    10/2018    Rosenberg
10,331,265 B2 †    6/2019    Rosenberg
10,564,839 B2 †    2/2020    Rosenberg
(Continued)

FOREIGN PATENT DOCUMENTS

CN        217181471 U      8/2022
WO        2021188115 A1      9/2021

OTHER PUBLICATIONS

International Search Report and Written Opinion received for PCT Application No. PCT/US2024/026707, Jul. 16, 2024, 14 pages.
(Continued)

*Primary Examiner* — Richard J Hong
(74) *Attorney, Agent, or Firm* — Holzer Patel Drennan

(57)        ABSTRACT

Current mobile devices that feature force feedback touchpads include haptic engines that operate in a narrow bandwidth and therefore cannot be used as a dual-purpose center channel for media playback. Further, a separate dedicated loudspeaker for a center channel would add cost and reduce integration space. The presently disclosed dual-use haptic trackpad loudspeaker can enable an enhanced audio experience without the need for an additional dedicated loudspeaker. The dual-use haptic trackpad loudspeaker can be used for haptics feedback as well as provide audio output over the frequency range 400 Hz to 10 kHz. The dual-use haptic trackpad loudspeaker may use a tuned spring-mass actuator and adopt mechanical properties to provide a specific desired mechanical compliance to the dual-use haptic trackpad loudspeaker.

20 Claims, 6 Drawing Sheets

(58) Field of Classification Search
CPC . H04R 1/028; H04R 7/06; H04R 7/04; H03K 17/9643; H01L 27/1218; A63F 13/92
See application file for complete search history.

(56)                References Cited

U.S. PATENT DOCUMENTS

| | | | |
|---|---|---|---|
| 10,866,642 | B2 † | 12/2020 | Rosenberg |
| 11,269,452 | B2 † | 3/2022 | Rosenberg |
| 11,422,631 | B2 † | 8/2022 | Junus |
| 11,880,506 | B2 † | 1/2024 | Rosenberg |
| 12,164,690 | B2 † | 12/2024 | Rosenberg |
| 2003/0059068 | A1 * | 3/2003 | Bank ...................... G06F 1/169 |
| | | | 381/337 |
| 2004/0047120 | A1 * | 3/2004 | Saiki ..................... G06F 1/1616 |
| | | | 361/679.55 |
| 2007/0145857 | A1 * | 6/2007 | Cranfill ................... G06F 3/016 |
| | | | 310/319 |
| 2008/0143496 | A1 | 6/2008 | Linjama |
| 2010/0141408 | A1 * | 6/2010 | Doy ........................ G06F 3/016 |
| | | | 345/173 |
| 2011/0274303 | A1 * | 11/2011 | Filson .................... H04R 1/028 |
| | | | 29/592.1 |
| 2014/0009441 | A1 * | 1/2014 | Bernstein .............. G06F 1/1662 |
| | | | 345/174 |
| 2014/0022189 | A1 * | 1/2014 | Sheng ..................... H04R 1/00 |
| | | | 345/173 |
| 2014/0145836 | A1 * | 5/2014 | Tossavainen ............ H04R 7/04 |
| | | | 340/407.2 |
| 2016/0004311 | A1 * | 1/2016 | Yliaho ..................... G06F 3/165 |
| | | | 381/99 |
| 2016/0252959 | A1 | 9/2016 | Rosenberg et al. |
| 2017/0083098 | A1 | 3/2017 | Usui |
| 2017/0192542 | A1 | 7/2017 | Kim |
| 2017/0289699 | A1 * | 10/2017 | Srivastava ............... H04R 7/06 |
| 2018/0083098 | A1 * | 3/2018 | Goktepeli .......... H01L 27/1218 |
| 2019/0094973 | A1 | 3/2019 | Miller et al. |
| 2019/0200139 | A1 * | 6/2019 | Starnes ................... G01L 5/167 |
| 2021/0096613 | A1 * | 4/2021 | Peeler ................... G06F 1/1686 |
| 2021/0225138 | A1 * | 7/2021 | Sheng ............... H03K 17/9643 |
| 2021/0240267 | A1 * | 8/2021 | Gajiwala ............... G06F 3/0219 |
| 2021/0240271 | A1 * | 8/2021 | Gajiwala ............... G06F 3/0414 |
| 2022/0365601 | A1 * | 11/2022 | Zhao ..................... G06F 3/0383 |
| 2022/0382340 | A1 | 12/2022 | Peeler et al. |
| 2023/0104514 | A1 * | 4/2023 | Chen ....................... A63F 13/92 |
| | | | 340/691.5 |
| 2023/0266829 | A1 † | 8/2023 | Sathe |
| 2023/0305637 | A1 † | 9/2023 | Rosenberg |
| 2023/0315214 | A1 † | 10/2023 | Lochun |
| 2024/0281083 | A1 † | 8/2024 | Terracina |

OTHER PUBLICATIONS

Peterson, Zachariah, "Driving Haptic Vibration and Feedback in Wearables | PCB Design Blog | Altium Designer," Retrieved from the Internet: URL: https://resources.altium.com/p/driving-hapticvibration-and-feedback-wearables, Sep. 25, 2020, 06 Pages.
International Preliminary Report On Patentability received for PCT Application No. PCT/US2024/026707, mailed on Nov. 27, 2025, 10 pages.

* cited by examiner
† cited by third party

600

610 — Provide a printed circuit board (PCB), array of resilient spacers, touch sensor, haptic element, and flexible sealing surround.

620 — Drive substantially orthogonal oscillation of the touch sensor using the haptic element to provide haptic feedback.

630 — Drive piston mode substantially orthogonal oscillation of the touch sensor using the haptic element to provide acoustic oscillation.

640 — Drive distributed mode substantially orthogonal oscillation of the touch sensor using the haptic element to provide acoustic oscillation.

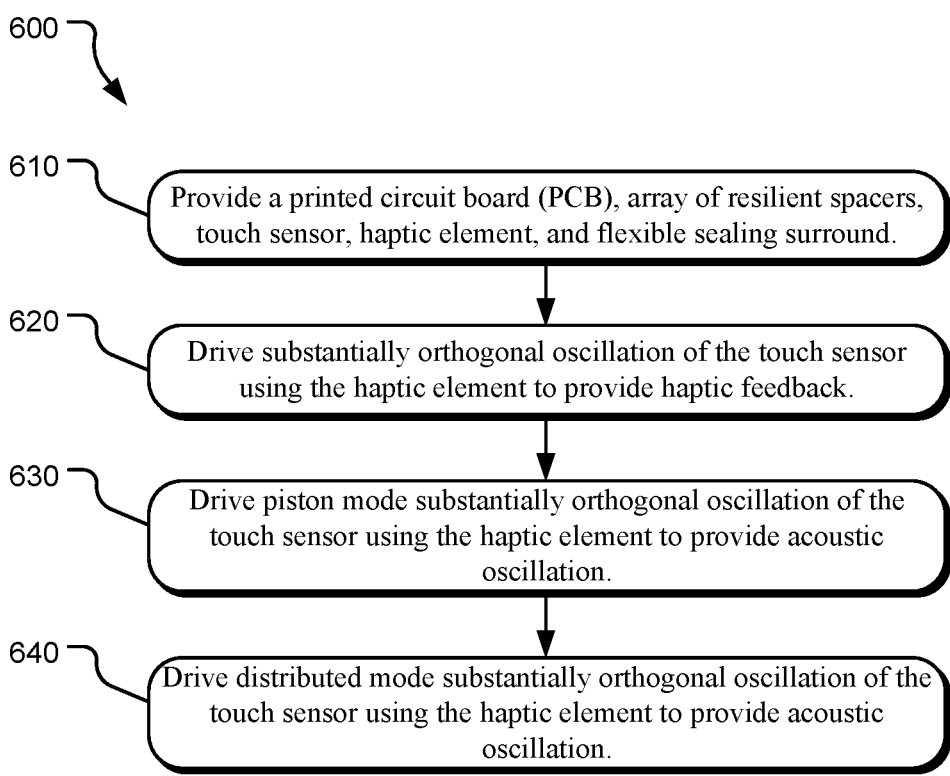

FIG. 6

HAPTIC TRACKPAD LOUDSPEAKER

BACKGROUND

A trackpad (also referred to as a touchpad) is a pointing device featuring a tactile sensor that can detect the position and motion and of a user's finger(s) on a sensing surface and convert the detected position and motion into a digital output. The digital output of the trackpad is input to an operating system, which in turn displays a position and motion of a cursor corresponding to the user's finger(s) on a display screen of a computing device. Some trackpads are "clickable" (also referred to as clickpads), which refers to an additional ability to detect a magnitude of force on or displacement of the sensing surface caused by the user's finger(s) and include force/displacement magnitude in the digital output.

SUMMARY

Implementations described and claimed herein provide a haptic trackpad loudspeaker comprising a printed circuit board (PCB) oriented within a recess of a device chassis, the PCB to control haptic and acoustic operation of the haptic trackpad loudspeaker; an array of resilient spacers bonding a first side of the PCB to a bottom surface of the device chassis within the recess; a touch sensor attached to a second side opposite the first side of the PCB, the touch sensor to function as a haptic surface and a diaphragm for the haptic trackpad loudspeaker; a haptic element attached to the first side of the PCB within the recess and above the bottom surface of the device chassis, the haptic element to drive substantially orthogonal oscillation of the touch sensor within the recess to selectively provide haptic feedback and acoustic oscillation; and a flexible sealing surround bonding a perimeter of the haptic trackpad loudspeaker to the device chassis to function as suspension for the touch sensor.

Implementations described and claimed herein further provide a method of operating a haptic trackpad loudspeaker comprising driving substantially orthogonal oscillation of the touch sensor using the haptic element at frequencies less than 400 Hz to provide haptic feedback, driving piston mode substantially orthogonal oscillation of the touch sensor using the haptic element at frequencies from 400 Hz to 3 kHz to provide acoustic oscillation, and driving distributed mode substantially orthogonal oscillation of the touch sensor using the haptic element at frequencies above 3 kHz to provide acoustic oscillation.

Implementations described and claimed herein further still provide a mobile computing device comprising a device chassis including a centrally located recess, a left channel speaker, a right channel speaker, and the haptic trackpad loudspeaker to function as a center channel speaker.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

BRIEF DESCRIPTIONS OF THE DRAWINGS

FIG. 6 illustrates example operations for operating a haptic trackpad further functioning as a loudspeaker according to the presently disclosed technology.

DETAILED DESCRIPTIONS

Figure 1:
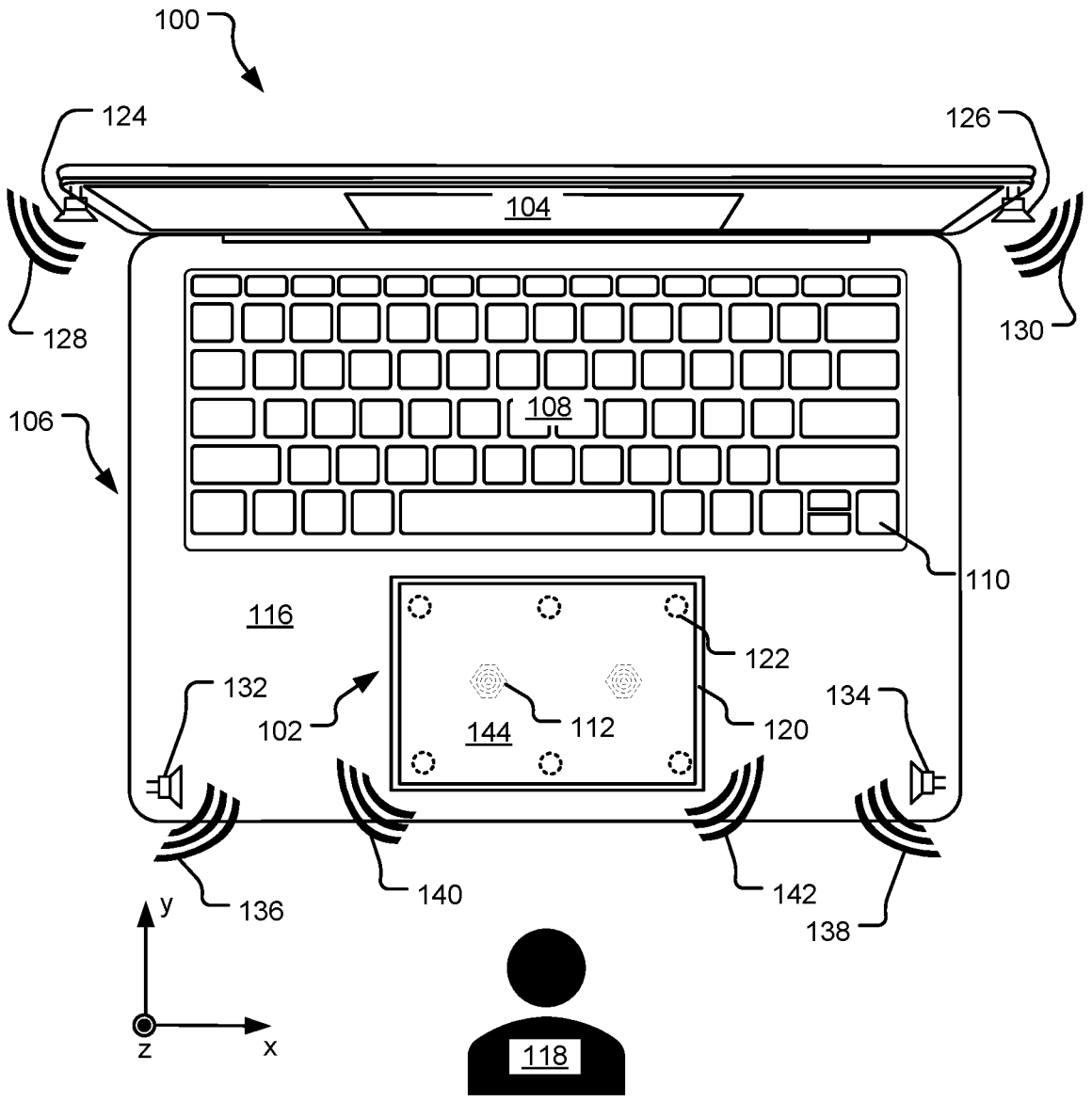
FIG. 1 illustrates a perspective view of an example mobile computing device including a haptic trackpad further functioning as a loudspeaker according to the presently disclosed technology.

Mobile computing devices, such as smart phones, tablet computers, and laptop computers often incorporate one or more trackpads as user input devices. Tradition clickable trackpads have a mechanical switch coupled to the trackpad surface, so there is clear tactile feedback when the user applies enough force to generate a "click," i.e., the track pad "sinks" slightly in order to actuate the switch.

To eliminate the mechanical switch and thus the need to have a movable trackpad surface, the "click" may alternatively be determined by the amount of force the user is exerting on the trackpad. Haptic tactile feedback is then generated by a haptics transducer that generates a brief vibration that mimics traditional tactile feedback of a mechanically depressible track pad. An associated operating system may utilize the force/displacement magnitude applied by the user's finger(s) to determine if the user intends to "click" the trackpad in the detected position and with the detected motion of the user's finger(s). Supplementing the movement stroke of a trackpad with a haptic response is one way to provide feedback to a user, for example, by indicating that sufficient force has been detected by the trackpad to register a "click." Such trackpads are known as haptic trackpads.

Mobile computing devices often also incorporate one or more loudspeakers (or simply speakers) to convert an electrical audio signal originating from the mobile computing device into corresponding sounds for a user to hear. However, speakers occupy space within the computing device, and space is often at a premium in such devices. Such devices also often incorporate a haptic trackpad as a user input device. Modern haptic trackpads typically adopt a relatively large surface area to enhance the user experience and selective oscillation of the trackpad provides haptic feedback to the user.

A combination of these features allows a specifically designed haptic trackpad to further function as a loudspeaker (referred to herein as a haptic trackpad loudspeaker) to replace or enhance one or more dedicated speakers within a mobile computing device. The disclosed haptic trackpad loudspeakers are technically advantageous in that they may allow for an enhanced user audio experience when used in combination with one or more traditional speakers within a mobile computing device. Alternatively, the disclosed haptic trackpad loudspeakers may replace some or all of traditional speakers within a mobile computing device to reduce cost or reclaim space within the mobile computing device formerly occupied by the traditional speaker(s). Thus, a technical advantage of the presently disclosed haptic trackpad loud-speakers is the efficient use of space occupied by a haptic trackpad repurposed to additionally function as a loud-speaker. In mobile computing devices, this can free up space normally occupied by dedicated loudspeakers for other purposes or improve audio quality provided by the mobile computing device by providing an additional loudspeaker.

FIG. 1 illustrates a perspective view of an example mobile computing device 100 including a haptic trackpad 102 further functioning as a loudspeaker (also referred to herein as haptic trackpad loudspeaker 102) according to the pres-ently disclosed technology. The mobile computing device 100 includes a display portion 104 hingedly connected to a keyboard portion 106, which includes a keypad 108 and the haptic trackpad loudspeaker 102 mounted within device chassis (or frame) 116. The keypad 108 contains an array of keys (e.g., key 110) arranged in a predetermined pattern (e.g., QWERTY). Each key within the keypad 108 may be communicatively connected to the mobile computing device 100. The haptic trackpad loudspeaker 102 (also referred to herein as a user-depressible touchpad loudspeaker or mouse-pad loudspeaker) converts physical user inputs into corre-sponding electrical signals that may be interpreted by the mobile computing device 100, as well as providing haptic feedback to user 118.

The haptic trackpad loudspeaker 102 may have a variety of mechanical arrangements that achieves a specified physi-cal depression magnitude (or travel), with a specified force-deflection profile. The haptic trackpad loudspeaker 102 includes at least a printed circuit board (PCB, not shown, see e.g., PCB 248 of FIG. 2) with an associated touch sensor 144 (also referred to as a touch glass or simply glass) attached or adhered to the depicted top side of the PCB. In various implementations, the PCB controls haptic and acoustic operation of the haptic trackpad loudspeaker 102 through the touch sensor 144. In other implementations, a separate PCB or other control device connected via a flex cable or arrange-ment of wires controls haptic and acoustic operation of the haptic trackpad loudspeaker 102 through the touch sensor 144.

The haptic trackpad loudspeaker 102 is oriented within a recess in the device chassis 116. An array of resiliently deflectable spacers (e.g., resilient spacer 122) are spaced apart across an x-y plane of the haptic trackpad loudspeaker 102 and attach a bottom side (not depicted, see e.g., bottom side 252 of FIG. 2) of the PCB to a bottom surface (also not depicted) of the device chassis 116. The resilient spacers provide z-direction compliance and separate the PCB the bottom surface of the device chassis 116 underlying the haptic trackpad loudspeaker 102. While 6 resilient spacers are depicted, in other implementations greater or fewer spacers may be used. Use of the resilient spacers is techni-cally advantageous in that they provide a tunable suspension for the haptic trackpad loudspeaker 102, which is important for acoustic performance of the haptic trackpad loudspeaker 102, as discussed in further detail below.

While the haptic trackpad loudspeaker 102 is capable of physical depression in the z-direction in order to detect the force magnitude applied on the haptic trackpad loudspeaker 102, the physical depression may be insufficient to provide the user 118 adequate feel and feedback. For example, the depression may be too small for the user 118 to gauge application of adequate pressure to constitute a "click." To enhance the user's perception of adequate pressure to con-stitute a "click," the haptic trackpad loudspeaker 102 includes one or more haptic elements (e.g., haptic element 112) that is actuated by and works in conjunction with the physical travel of the haptic trackpad loudspeaker 102 to give physical feedback to the user that adequate force to constitute a "click" has been detected by the haptic trackpad loudspeaker 102. This may offer the user 118 a feel and overall performance comparable to a traditional clickable button snap-over collapsing in physical travel. While two haptic elements are illustrated in FIG. 1, any number of haptic elements may be distributed across the haptic track-pad loudspeaker 102 to give sufficient haptic feedback and audio output.

The haptic element 112 is attached to the bottom side of the PCB and generates haptic feedback in the form of a user-perceptible "click" by generating vibration or other repeated forces or motions (collectively, haptic responses) and transmitting the generated vibration, forces, or motions to the user via the haptic trackpad loudspeaker 102 concur-rently with or immediately before or after the physical travel of the haptic trackpad loudspeaker 102 caused by the user's application of force on the haptic trackpad loudspeaker 102. Both the resilient spacers and the haptic element 112 are depicted in broken lines in FIG. 1 as they are hidden from view by the haptic trackpad loudspeaker 102 and thus would not normally be visible from an exterior of the mobile computing device 100. The haptic element 112 may utilize a variety of technologies to generate the vibration or other repeating forces or motions (e.g., weighted and unbalanced motors or electromagnetic actuators, linear resonant actua-tors (LRAs) solenoids, direct drive actuators, piezoelectric devices, vibra-motors, electrostatic feedback devices, and ultrasonic devices). In various implementations, the haptic feedback is defined as any repeating oscillating motion that exceeds 1 g of acceleration and an approximately 100-micron displacement, while overall staying in position.

The haptic element 112 is oriented such that its oscillating motion is linear and oriented substantially orthogonal to the touch sensor 144 (oriented in the z-direction). The haptic element 112 drives substantially orthogonal oscillation of the touch sensor 144 within the recess to selectively provide haptic feedback to the user 118 through the touch sensor 144 and acoustic oscillation of the touch sensor 144 to generate sound. A perimeter of the haptic trackpad loudspeaker 102 is secured to the device chassis 116 using a flexible sealing surround 120, thereby rendering the touch sensor 144 of the haptic trackpad loudspeaker 102 functional as a speaker diaphragm suspended from the device chassis 116 using the flexible sealing surround 120. As used herein, substantially orthogonal is defined as sufficiently orthogonal to the touch sensor 144 to allow the touch sensor 144 to effectively function as a loudspeaker (e.g., with a variance of up to 10-degrees in any direction). The variance may be fixed or variable over time. In various implementations, the flexible sealing surround 120 is secured to an exterior-facing perim-eter of the touch sensor 144 or an interior-facing surface of the PCB, or both.

The flexible sealing surround 120 is technically advanta-geous by functioning as suspension to keep the touch sensor 144 centered within an aperture or recess in the device chassis 116 and provides a restoring (centering) force that returns the touch sensor 144 to a neutral position with reference to the device chassis 116 absent a driving force away from the neutral position. The flexible sealing sur-round 120 may be made of any flexible material that can withstand the repeated oscillation of the touch sensor 144 with reference to the device chassis 116 (e.g., polyester foam, rubber (natural or synthetic), corrugated fabric (per-haps impregnated with a resin), treated or impregnated paper, and so on).

5

6

Figure 4:
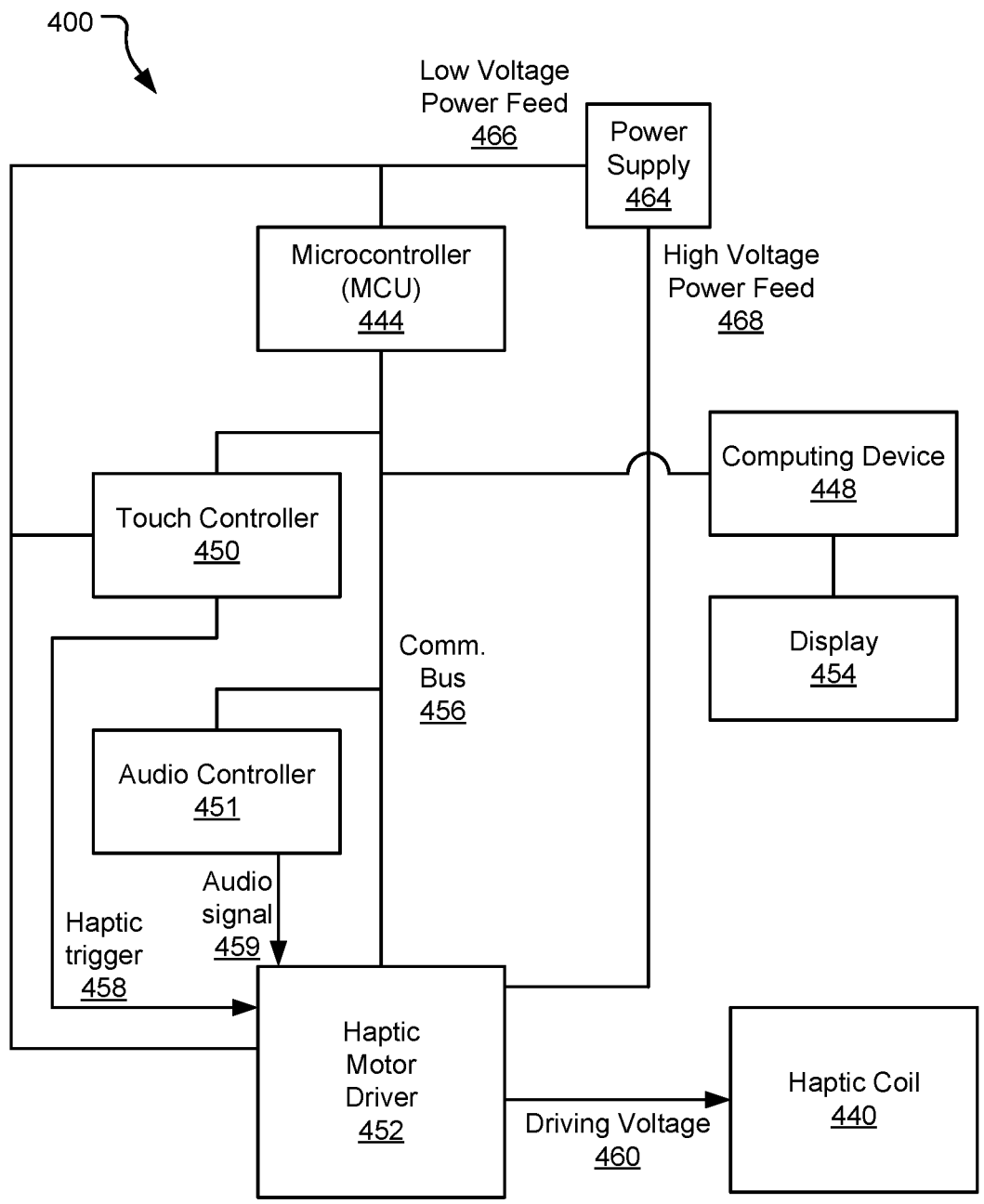
FIG. 4 illustrates an example electrical architecture for a haptic trackpad further functioning as a loudspeaker according to the presently disclosed technology.

In addition to providing haptic feedback, the haptic element 112 functions as a voice coil and magnet to generate linear, oscillating mechanical forces that move the touch sensor 144 back and forth, reproducing sound under the control of an applied electrical signal coming from an audio controller (not shown, see e.g., audio controller 451 of FIG. 4). As a result, when used as a driver for reproducing sound, the haptic element 112 can be used to drive motion of the touch sensor 144 to function as a loudspeaker. Use of the haptic trackpad loudspeaker 102 as both a haptic device and a loudspeaker is technically advantageous in that it allows for a singular component to serve two distinct purposes (i.e., providing haptic feedback to the user 118 via the touch sensor 144 and generation of audio for the user 118 to hear). In various implementations, the audio generated by the haptic trackpad loudspeaker 102 includes media playback (e.g., music, movies, voice playback, and/or audio from virtual meetings) and/or audio notifications.

The haptic trackpad loudspeaker 102 generates sound waves in all outward directions from the touch sensor 144 of the haptic trackpad loudspeaker 102, though only sound waves 140, 142 that are generally directed toward the user 118 are illustrated in FIG. 1. In some implementations, the haptic trackpad loudspeaker 102 is the only speaker included within the mobile computing device 100 and operates as a 1-channel audio system.

The haptic trackpad loudspeaker 102 may further function as a center channel in a 3-channel (or a center-front channel in a 5-channel) audio system. Specifically, in a 3-channel audio system, the mobile computing device 100 is further equipped with a pair of dedicated micro-speakers 124, 126 oriented on opposing sides of the display 104 and generating sound waves 128, 130, respectively, directed at the user 118. These dedicated micro-speakers 124, 126 function as left and right channels for the mobile computing device 100, respectively, while the haptic trackpad loudspeaker 102 functions as the center channel. Use of the haptic trackpad loudspeaker 102 as a center channel is technically advantageous as it is centrally located within the mobile computing device 100, while the micro-speakers 124, 126 (and in some implementations, the additional speakers 132, 134) are typically located at the periphery of the mobile computing device 100. While the micro-speakers 124, 126 are shown in the display 104, other implementations may place the micro-speakers 124, 126 on left and right sides of the keyboard 106, respectively.

As noted above, the central location of the haptic trackpad loudspeaker 102 lends itself to functioning as a center channel, in a 3-channel audio system as described above or as a center-front channel in a 5-channel audio system, as further described below. The micro-speakers 124, 126 function as left-front and right-front channels for the mobile computing device 100, respectively, while the haptic trackpad loudspeaker 102 functions as the center-front channel. Additional speakers 132, 134 generating sound waves 136, 138 function as left-rear and right-rear speakers, respectively, in the 5-channel audio system.

Due to size limitations, the micro-speakers 124, 126 (and in some implementations, the additional speakers 132, 134) may lack functionality in the lower audio bands due to inherent limitations on the size of the micro-speakers 124, 126 and/or additional speakers 132, 134 and their ability to push sufficient air to generate sound in the lower audio bands. As the surface area of the planar touch sensor 144 of the haptic trackpad loudspeaker 102 is much larger than the diaphragms in each of at least the micro-speakers 124, 126, if not the speakers 132, 134, the haptic trackpad loudspeaker

102 can cover lower audio bands for the entire 3-channel or 5-channel audio system (functioning as a full-range, mid-range, or low-range speaker, such as a woofer). This is technically advantageous in that the haptic trackpad loudspeaker 102 allows the overall audio system to cover a wider frequency range, thus improving overall audio output. In other implementations, the micro-speakers 124, 126 (and in some implementations, the additional speakers 132, 134) may cover a wider frequency range than the haptic trackpad loudspeaker 102, including the lower audio bands. Further, the additional speakers 132, 134 may be external to the mobile computing device 100 and placed behind the user 118, rather than the depicted locations internal to the mobile computing device 100.

While 1-channel, 3-channel, and 5-channel audio systems are depicted in FIG. 1 and described in detail above, the haptic trackpad loudspeaker 102 may serve one channel in an audio system comprising any number of total channels. Further, the haptic trackpad loudspeaker 102 may share a channel with any number of other speakers. In one example implementation, the haptic trackpad loudspeaker 102 may constitute one of multiple loudspeakers, each of which cover only a portion of the overall audio range for a loudspeaker system, akin to a loudspeaker enclosure having multiple wide-range drivers, each having a different frequency range.

In various implementations, depending upon the computing device type and construction, the device chassis 116 may be a device bucket or mid-frame, which serves as a structural framework for the mobile computing device 100 and a surround for the haptic trackpad loudspeaker 102. The resilient spacers connect portions of the haptic trackpad loudspeaker 102 to the device chassis 116. In order for the haptic element 112 to vibrate the haptic trackpad loudspeaker 102 in the z-direction, the haptic trackpad loudspeaker 102 is designed for compliance in the z-direction with reference to the device chassis 116 using the resilient spacers. This allows the haptic trackpad loudspeaker 102 to be capable of movement caused by the haptic element 112 in the z-direction with reference to the device chassis 116.

XYZ coordinates are shown and described to illustrate directional features of the disclosed technology. Other coordinate systems may also be used with different orientations with similar effect. Further, various aspects of the haptic trackpad loudspeaker 102 (e.g., the haptic element 112 and the resilient spacers) are depicted in broken lines in FIG. 1. These features would not normally be visible from an exterior of the mobile computing device 100 and/or may appear far different from the depictions in FIG. 1 but are nonetheless shown to illustrate the disclosed technology.

In various implementations, the mobile computing device 100 may be a tablet computer, a laptop computer, a personal computer, a gaming device, a smart phone, or any other discrete mobile device that carries out one or more specific sets of arithmetic and/or logical operations. The haptic trackpad loudspeaker 102 may further be applied to vehicles (e.g., automobiles, watercraft, and aircraft), consumer electronics (e.g., cameras, telephones, and home appliances), and industrial or commercial machinery, with or without the mobile computing device 100.

In other implementations, features of the haptic trackpad loudspeaker 102, including the haptic element 112, the flexible sealing surround 120, and the resiliently deflectable spacers, may be applied to a stand-alone haptic trackpad with a touch sensor 144, with or without the mobile computing device 100 connected thereto. In such implementations, the haptic trackpad loudspeaker 102 may be used to output audio notifications of a status of the stand-alone haptic trackpad. As examples, the status may include one or more of battery state of charge (e.g., different noises, each corresponding to a full battery, a partially full battery, and a nearly empty battery), wireless signal strength (e.g., different noises, each corresponding to a strong signal strength, a weak signal strength, and no wireless connection), physical proximity of the haptic trackpad loudspeaker (e.g., a noise that changes in pitch and/or volume as a user approaches the stand-alone haptic trackpad), and accessibility features (e.g., different noises, one corresponding to powering on the stand-alone haptic trackpad and another corresponding to powering off the stand-alone haptic trackpad).

While specifically described above for stand-alone haptic trackpads, the foregoing status notifications may be used for other peripheral devices that incorporate a haptic loudspeaker (e.g., a haptic keyboard). Use of the haptic trackpad loudspeaker for audio status notifications is technically advantageous in that prior art solutions (e.g., visual status notifications, e.g., light-emitting diodes) can be expensive and distracting to a user. The haptic trackpad loudspeaker achieves a similar effect without additional components and in some implementations, in a less distracting manner. The audio status notifications are also advantageous for the visually impaired.

Figure 2:
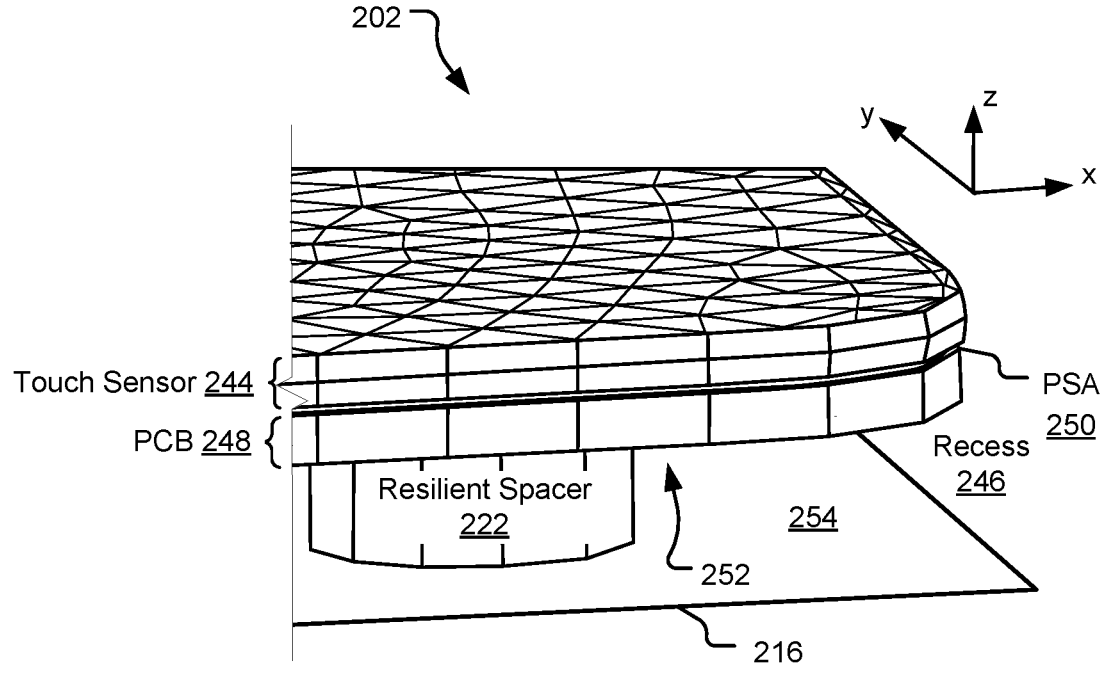
FIG. 2 illustrates a partial perspective view of an example haptic trackpad loudspeaker stackup according to the presently disclosed technology.

FIG. 2 illustrates a partial perspective view of an example haptic trackpad loudspeaker stackup 202 according to the presently disclosed technology. The haptic trackpad loudspeaker stackup 202 is oriented within a recess 246 in a device chassis 216. The haptic trackpad loudspeaker stackup 202 includes at least a printed circuit board (PCB) 248 with an associated touch sensor 244 (also referred to as a touch glass or simply glass) adhered to the top side of the PCB 248 using pressure sensitive adhesive (PSA) 250, or other adhesives or mechanical attachments. The PCB 248 detects location, size, and motion of a user's touch inputs on the touch sensor 244 and the PCB 248 converts the location, size, and motion of the user's touch inputs into an electronic signal that can be interpreted by a computing device. In some implementations, the PCB 248 further controls haptic and acoustic operation of a resulting haptic trackpad loudspeaker (not shown, see e.g., haptic trackpad loudspeaker 102 of FIG. 1) through the touch sensor 244. In other implementations, a separate PCB or other control device connected via a flex cable or arrangement of wires controls haptic and acoustic operation of the haptic trackpad loudspeaker through the touch sensor 244. The PCB 248 may utilize capacitive or resistive technology for sensing the user's touch inputs through the touch sensor 244, as examples. Further, the various components of the haptic trackpad loudspeaker stackup 202 may be permanently bonded or laminated together.

An array of resiliently deflectable spacers (e.g., resilient spacer 222) are spaced apart across an x-y plane of the haptic trackpad loudspeaker stackup 202 and attach a bottom side 252 of the PCB 248 to a bottom surface 254 of the device chassis 216 within the recess 246. The resilient spacers provide z-direction compliance and separate the PCB 248 from the bottom surface 254 of the device chassis 216 underlying the haptic trackpad loudspeaker stackup 202. While the resiliently deflectable spacers support the PCB 248 in a spaced relationship from the device chassis 216 in the z-direction, they also generally keep the haptic trackpad loudspeaker stackup 202 centered within the recess 246 (in the x-y plane). This allows the PCB 248 and the associated touch sensor 244 to selectively oscillate in the z-direction to provide haptic feedback to the user and/or audio output.

In various implementations, the resiliently deflectable spacers are of a rubber, silicone, plastic, and/or composite construction. While a singular resilient spacer 222 is depicted, in other implementations greater or fewer spacers may be used. Use of the resilient spacers is technically advantageous in that they provide a tunable suspension for the resulting haptic trackpad loudspeaker, which is important for acoustic performance of the haptic trackpad loudspeaker, as discussed in further detail below.

XYZ coordinates are shown and described to illustrate directional features of the disclosed technology. Other coordinate systems may also be used with different orientations with similar effect. In various implementations, the haptic trackpad loudspeaker stackup 202 may be used in conjunction with a mobile computing device, such as a tablet computer, a laptop computer, a personal computer, a gaming device, a smart phone, or any other discrete mobile device that carries out one or more specific sets of arithmetic and/or logical operations. The haptic trackpad loudspeaker stackup 202 may further be applied to vehicles (e.g., automobiles, watercraft, and aircraft), consumer electronics (e.g., cameras, telephones, and home appliances), and industrial or commercial machinery.

Figure 3:
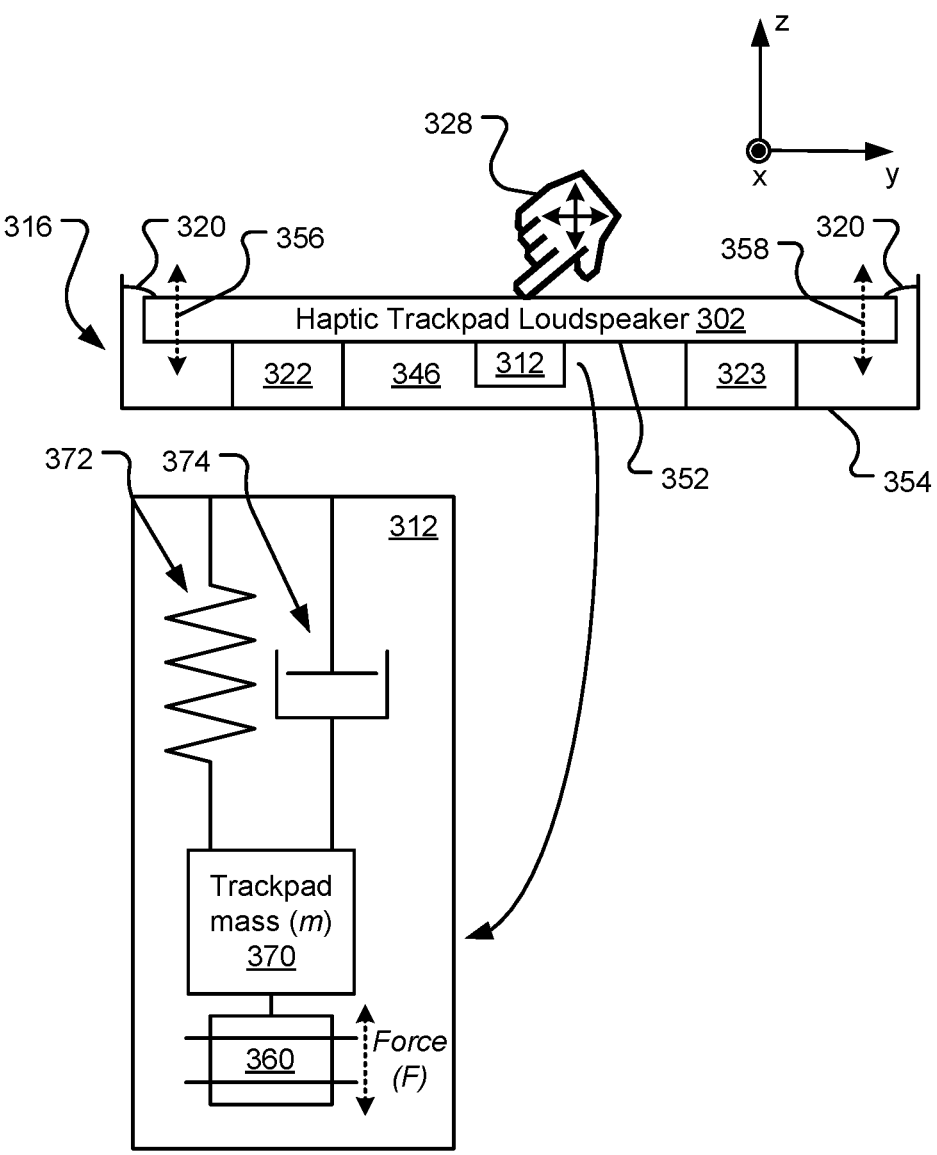
FIG. 3 illustrates a model of z-direction motion of an example haptic trackpad further functioning as a loudspeaker driven by a linear spring-mass resonator according to the presently disclosed technology.

FIG. 3 illustrates a model of z-direction motion of an example haptic trackpad 302 further functioning as a loudspeaker (also referred to herein as haptic trackpad loudspeaker 302) driven by a linear spring-mass resonator 312 according to the presently disclosed technology. The haptic trackpad loudspeaker 302 is oriented within a recess 346 in a device chassis 316. The haptic trackpad loudspeaker 302 includes at least a printed circuit board (PCB) with an associated touch sensor (also referred to as a touch glass or simply glass) adhered to the top side of the PCB. The PCB detects location, size, and motion of a user's touch inputs on the touch sensor, illustrated as applied by user's hand 328, and the PCB converts the location, size, and motion of the user's touch inputs into an electronic signal that can be interpreted by a computing device. In some implementations, the PCB further controls haptic and acoustic operation of the haptic trackpad loudspeaker 302 through the touch sensor. In other implementations, a separate PCB or other control device connected via a flex cable or arrangement of wires controls haptic and acoustic operation of the haptic trackpad loudspeaker 302 through the touch sensor.

An array of resiliently deflectable spacers (e.g., resilient spacers 322, 323) are spaced apart across an x-y plane of the haptic trackpad loudspeaker 302 and attach a bottom side 352 of the haptic trackpad loudspeaker 302 to a bottom surface 354 of the device chassis 316 within the recess 346. The resilient spacers provide z-direction compliance and separate the haptic trackpad loudspeaker 302 from the bottom surface 354 of the device chassis 316 underlying the haptic trackpad loudspeaker 302. While the resiliently deflectable spacers support the haptic trackpad loudspeaker 302 in a spaced relationship from the device chassis 316 in the z-direction, they also generally keep the haptic trackpad loudspeaker 302 centered within the recess 346 (in the x-y plane). This allows the haptic trackpad loudspeaker 302 to selectively oscillate in the z-direction to provide haptic feedback and/or audio output to the user. In an example implementation, the array of resiliently deflectable spacers are at least 0.5 mm tall to provide a space with sufficient air compliance behind the haptic trackpad loudspeaker 302 for accurate reproduction of sound.

A perimeter of the haptic trackpad loudspeaker 302 is secured to the device chassis 316 using a flexible sealing surround 320, thereby rendering the touch sensor of the haptic trackpad loudspeaker 302 functional as a speaker diaphragm suspended from the device chassis 316 using the flexible sealing surround 320. The flexible sealing surround 320 functions as suspension to keep the haptic trackpad loudspeaker 302 centered within the recess 346 in the device chassis 316 and provides a restoring (centering) force that returns the haptic trackpad loudspeaker 302 to a neutral position with reference to the device chassis 316 absent a driving force away from the neutral position. In some implementations, the flexible sealing surround 320 further functions to provide an ingress protection rating for the haptic trackpad loudspeaker 302.

The linear spring-mass resonator 312 (also referred to herein as a haptic element) is attached to the bottom side of the haptic trackpad loudspeaker 302 and generates haptic feedback by generating vibration or other repeated forces or motions (collectively, haptic responses) and transmitting the generated vibration, forces, or motions to the user via the haptic trackpad loudspeaker 302 concurrently with or immediately before or after the physical travel of the haptic trackpad loudspeaker 302 caused by the user's application of force on the haptic trackpad loudspeaker 302 with the user's hand 328. The linear spring-mass resonator 312 is oriented such that its oscillating motion, illustrated by arrows 356, 358, is linear and oriented substantially orthogonal to the haptic trackpad loudspeaker 302 (oriented in the z-direction). The linear spring-mass resonator 312 drives the substantially orthogonal oscillation of the haptic trackpad loudspeaker 302 within the recess 346 to selectively provide haptic feedback to the user via the user's hand 328. In addition to providing haptic feedback, the linear spring-mass resonator 312 functions as a voice coil and magnet to generate linear, oscillating mechanical forces that move the haptic trackpad loudspeaker 302 back and forth, reproducing sound under the control of an applied electrical signal coming from an audio controller (not shown, see e.g., audio controller 451 of FIG. 4).

As a result, when used as a driver for reproducing sound, the linear spring-mass resonator 312 can be used to drive motion of the haptic trackpad loudspeaker 302 to function as a loudspeaker. Substantially orthogonal oscillation is technically advantageous in that it is sufficiently effective for providing haptic feedback and allows the haptic trackpad loudspeaker 302 to function as a voice coil by moving the haptic trackpad loudspeaker 302 up and down without changing the direction of the oscillation of the linear spring-mass resonator 312. In an example implementation, the stroke of the oscillating motion of the haptic trackpad loudspeaker 302 is approximately 0.1 mm to achieve effective audio output. In other implementations, the aforementioned orthogonal oscillation is used for reproducing sound, while the haptic element is capable of oscillating within the x-y plane to provide haptic feedback. In such cases, the haptic element is capable of oscillation in all three of the illustrated directions (i.e., the x-direction, the y-direction, and the x-direction).

The linear spring-mass resonator 312 is also shown in a schematic view below the haptic trackpad loudspeaker 302. A combined mass of the haptic trackpad loudspeaker 302, including the linear spring-mass resonator 312, suspended from the device chassis 316 using the resiliently deflectable spacers 322, 323 and the flexible sealing surround 320 is referred to herein as the trackpad mass (m) 370. The trackpad mass (m) 370 and the combined effect of the linear spring-mass resonator 312, the resiliently deflectable spacers 322, 323, and the flexible sealing surround 320 is represented by dashpot (or damper) 372 and spring 374 in terms of their effect on movement of the trackpad mass (m) 370 under an oscillating force (F) applied by haptic motor 360.

The compliance and weight of each of the resiliently deflectable spacers 322, 323, the flexible sealing surround 320, the linear spring-mass resonator 312, and other components of the haptic trackpad loudspeaker 302 are tuned in a manner that results in an effective haptic response at a desired frequency and effective audio reproduction within a desired frequency range. The dashpot (or damper) 372 and spring 374 are representative of the combined effect of all the suspended components of the haptic trackpad loudspeaker 302. As a result, the haptic trackpad loudspeaker 302 and all of its suspended components function as a tuned spring-mass system, which is technically advantageous over a system not so tuned. In an example implementation, the haptic motor 360 is a linear resonance actuator tuned to function over a particularly broad frequency range (e.g., from 300 Hz to 6000 Hz), so that it may effectively provide haptic feedback at approximately 400 Hz (or less) and audio reproduction at 1000 Hz-6,000 Hz, or even 400 Hz-10,000 Hz), for example.

In a further example implementation, the haptic motor 360 includes an actuator magnet with a fixed polarity bonded to the device chassis 316 and a haptic coil (e.g., one or more spiral wound racetracks of wire or trace) embedded within the PCB of the haptic trackpad loudspeaker 302. Rapidly oscillating a current direction in the haptic coil causes a rapidly shifting z-direction forces on the haptic trackpad loudspeaker 302 caused by the actuator magnet. The resulting movement can be characterized as rapid acceleration and deceleration and change of direction of movement of the haptic trackpad loudspeaker 302 with reference to the device chassis 316, which yields rapid oscillation in the z-direction to provide haptic feedback and/or audio output to the user.

The haptic trackpad loudspeaker 302 can be simplified and modeled as the depicted spring-damper-mass vibration model actuated using the force (F). Suspended components of the haptic trackpad loudspeaker 302 in total can be considered a rigid body with the trackpad mass (m) 370. When the force (F) is applied, the resiliently deflectable spacers 322, 323 and the flexible sealing surround 320 will expand and contract and permit the haptic trackpad loudspeaker 302 to oscillate in the z-direction. This motion may be modeled by the depicted dashpot 372 and spring 374, having a damping constant c and a spring constant K, respectively. The force (F) may be generated electromagnetically from a direct drive actuator (not shown, see e.g., haptic driver 452 of FIG. 4), which applies the force (F) using a current-carrying conductor (not shown, see e.g., haptic coil 440 of FIG. 4) within a magnetic field.

XYZ coordinates are shown and described to illustrate directional features of the disclosed technology. Other coordinate systems may also be used with different orientations with similar effect. In various implementations, the haptic trackpad loudspeaker 302 may be used in conjunction with a mobile computing device, such as a tablet computer, a laptop computer, a personal computer, a gaming device, a smart phone, or any other discrete mobile device that carries out one or more specific sets of arithmetic and/or logical operations. The haptic trackpad loudspeaker 302 may further be applied to vehicles (e.g., automobiles, watercraft, and aircraft), consumer electronics (e.g., cameras, telephones, and home appliances), and industrial or commercial machinery.

FIG. 4 illustrates an example electrical architecture 400 for a haptic trackpad further functioning as a loudspeaker (e.g., haptic trackpad loudspeakers 102, 302 of FIGS. 1 and 3, respectively) according to the presently disclosed technology. The haptic trackpad loudspeaker converts physical user inputs, into corresponding electrical signals that may be interpreted by a computing device 448 (e.g., a tablet computer, a laptop computer, a personal computer, a gaming device, a smart phone, or any other discrete device that carries out one or more specific sets of arithmetic and/or logical operations). The haptic trackpad loudspeaker also provides haptic feedback and/or audio output to the user. The haptic trackpad loudspeaker is made up of a printed circuit board (PCB) (not shown, see e.g., PCB 248 of FIG. 2) with a touch sensor (not shown, see e.g., touch sensors 144 and 244 of FIGS. 1 and 2, respectively) mounted thereon. Some or all of the electronic components of the haptic trackpad loudspeaker illustrated in FIG. 4 and described in detail below are mounted on or incorporated within the haptic trackpad loudspeaker PCB.

A touch controller 450 captures user inputs on the haptic trackpad loudspeaker and sends a signal representing the user's inputs to a haptic microcontroller 444 for processing and output to the computing device 448 over a communication bus 456 (e.g., an inter-integrated circuit (FC connection). The computing device 448 may use the signal received from the haptic microcontroller 444 for user inputs to the computing device 448 and/or rendering on an associated display 454.

Once the touch controller 450 detects a click trigger event on the touch sensor, it sends a trigger 458 (e.g., a flag through a general-purpose input/output (GPIO)) to haptic motor driver 452 for haptic actuation of a haptic element (not shown, see e.g., haptic elements 112 and 312 of FIGS. 1 and 3, respectively) of the haptic trackpad loudspeaker. The haptic motor driver 452 (e.g., a H-bridge motor driver or a microcontroller integrated H-bridge) drives a haptic coil 440 with a driving voltage 460 having an alternating voltage polarity. The haptic driver 452 powers the haptic coil 440 to provide haptic feedback indicating a click upon a user's press and/or release event on the haptic trackpad.

An audio controller 451 receives an audio signal 459 from the microcontroller 444 over the communication bus 456. The computing device 448 may use the audio controller 451 to drive the haptic trackpad loudspeaker to generate an intended audio stream. Once the audio controller 451 receives the audio signal 459, it sends the audio signal 459 to the haptic motor driver 452 for haptic oscillation intended to reproduce the intended audio stream using the haptic trackpad loudspeaker. The haptic motor driver 452 drives the haptic coil 440 with the driving voltage 460 to generate the intended audio stream.

Power supply 464 powers various components of the electrical architecture 400. The haptic microcontroller 444 and the touch controller 450 are powered by the power supply 464 at a relatively low voltage (e.g., 1.8V-3.3V) for digital logic, as illustrated by low voltage power feed 466. The haptic driver 452 and the haptic coil 440 are powered by the power supply 464 at a relatively high voltage (e.g., 5V-12V), as illustrated by high voltage power feed 468. In various implementations, the computing device 448 may also be powered by the power supply 464, or another power supply.

Figure 5:
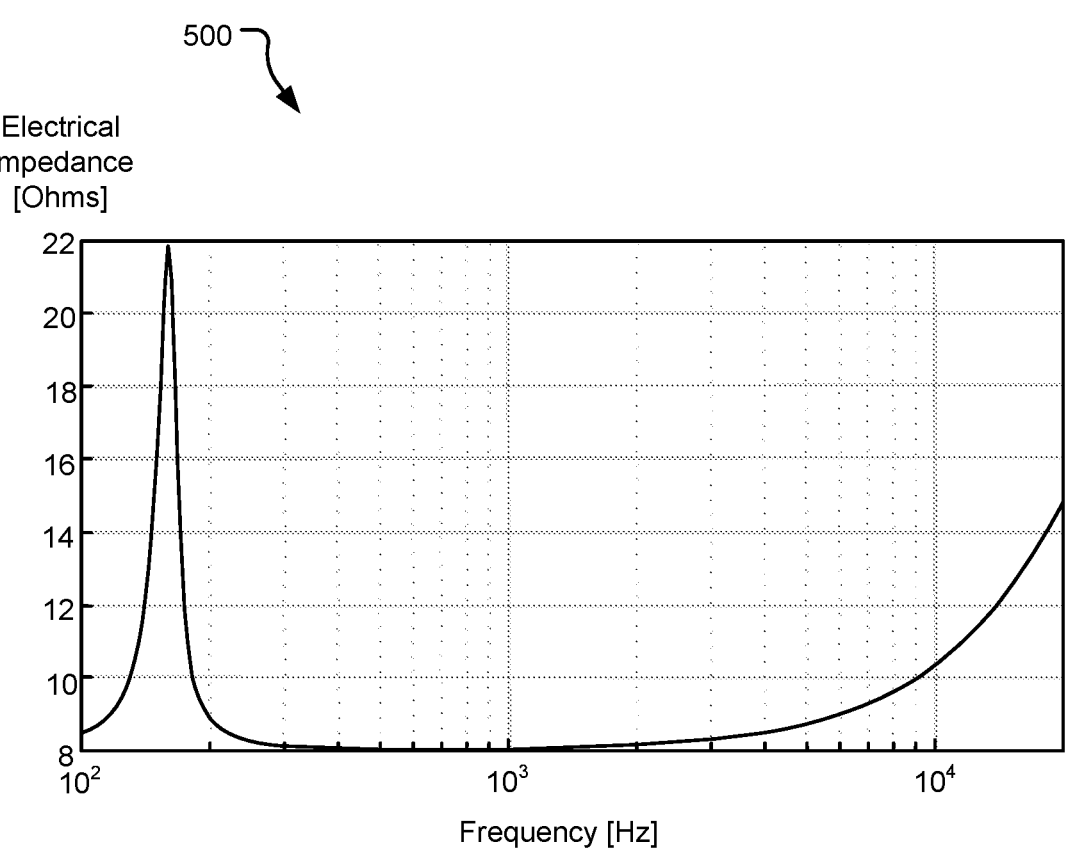
FIG. 5 illustrates electrical impedance of an example haptic trackpad further functioning as a loudspeaker as a function of frequency according to the presently disclosed technology.

FIG. 5 illustrates an electrical impedance chart 500 of an example haptic trackpad further functioning as a loudspeaker (e.g., haptic trackpad loudspeakers 102, 302 of FIGS. 1 and 3, respectively) as a function of frequency according to the presently disclosed technology. The haptic trackpad loudspeaker converts physical user inputs, into corresponding electrical signals that may be interpreted by a computing device 448 (not shown, see e.g., computing device 448 of FIG. 4). The haptic trackpad loudspeaker also provides haptic feedback and/or audio output to the user.

The haptic trackpad loudspeaker is tuned as described above with reference to FIG. 3, have resonance at the haptic frequency (here 160-200 Hz, or at least less than 400 Hz). This allows the haptic response to be generated using less energy than would otherwise be required at a non-resonant frequency. This further improves the perceived strength of the haptic response to a user. Further, by tuning the resonance frequency away from a frequency band that will be used for audio output (e.g., 400 Hz to 10 kHz), the haptic trackpad loudspeaker can omit a smoothing filter that would otherwise be required to maintain a consistent audio output across the frequency band that will be used for audio output. In sum, the haptic trackpad loudspeaker is tuned so that its resonant frequency is toward its haptic frequency and away from its audio output frequency band.

The haptic trackpad loudspeaker has three primary modes of operation. In a haptic mode, the haptic trackpad loudspeaker provides haptic responses to the user. The haptic mode frequency band is 160-200 Hz, or at least less than 400 Hz. In a piston resonance mode, the haptic trackpad loudspeaker provides audio output using its touch sensor as a diaphragm operating primarily (or mostly) in piston resonance. The piston resonance mode frequency band is 400 Hz to 3 kHz. In a distributed resonance mode, the haptic trackpad loudspeaker provides audio output using its touch sensor as a diaphragm operating primarily (or mostly) in distributed resonance. The distributed resonance mode frequency band is 3-10 kHz or above 3 kHz.

FIG. 6 illustrates example operations 600 for operating a haptic trackpad further functioning as a loudspeaker according to the presently disclosed technology. A providing operation 610 provides a printed circuit board (PCB) oriented within a recess of a device chassis. In some implementations, the PCB controls haptic and acoustic operation of the haptic trackpad loudspeaker. In other implementations, a separate PCB or other control device connected via a flex cable or arrangement of wires controls haptic and acoustic operation of the haptic trackpad loudspeaker. The providing operation 610 further provides an array of resilient spacers bonding a first side of the PCB to a bottom surface of the device chassis within the recess and a touch sensor attached to a second side opposite the first side of the PCB. The touch sensor functions as a haptic surface and a diaphragm for the haptic trackpad loudspeaker. The providing operation 610 further still provides a haptic element attached to the first side of the PCB within the recess and above the bottom surface of the device chassis and a flexible sealing surround bonding a perimeter of the haptic trackpad loudspeaker to the device chassis to function as suspension for the touch sensor.

A first driving operation 620 drives substantially orthogonal oscillation of the touch sensor using the haptic element at frequencies less than 400 Hz to provide haptic feedback. A second driving operation 630 drives piston mode substantially orthogonal oscillation of the touch sensor using the haptic element at frequencies from 400 Hz to 3 kHz to provide acoustic oscillation. A third driving operation 640 drives distributed mode substantially orthogonal oscillation of the touch sensor using the haptic element at frequencies above 3 kHz to provide acoustic oscillation.

The operations making up the embodiments of the presently disclosed technology are referred to variously as operations, steps, objects, or modules. Furthermore, the operations may be performed in any order, adding or omitting operations as desired, unless explicitly claimed otherwise or a specific order is inherently necessitated by the claim language. Unless otherwise explicitly defined, dimensions described as substantially or approximately herein are +/−10% of the values provided.

Various implementations described herein include a haptic trackpad loudspeaker comprising a printed circuit board (PCB) oriented within a recess of a device chassis, the PCB to control haptic and acoustic operation of the haptic trackpad loudspeaker; an array of resilient spacers bonding a first side of the PCB to a bottom surface of the device chassis within the recess; a touch sensor attached to a second side opposite the first side of the PCB, the touch sensor to function as a haptic surface and a diaphragm for the haptic trackpad loudspeaker; a haptic element attached to the first side of the PCB within the recess and above the bottom surface of the device chassis, the haptic element to drive substantially orthogonal oscillation of the touch sensor within the recess to selectively provide haptic feedback and acoustic oscillation; and a flexible sealing surround bonding a perimeter of the haptic trackpad loudspeaker to the device chassis to function as suspension for the touch sensor.

The haptic trackpad loudspeaker may further function as a center channel within a 3-channel or 5-channel audio system for a mobile computing device.

The haptic trackpad loudspeaker may further function as a speaker to selectively output audio notifications of a status of the haptic trackpad loudspeaker.

The audio notifications may include an indication of one or more of battery state of charge, wireless signal strength, physical proximity of the haptic trackpad loudspeaker, and accessibility features.

The haptic trackpad loudspeaker may be a tuned spring-mass system, and the haptic element may include a linear resonance actuator.

The haptic trackpad loudspeaker of claim 1 may be capable of audio output from 400 Hz to 10 kHz.

The haptic trackpad loudspeaker of claim 1 may be capable of haptic feedback at less than 400 Hz.

The haptic trackpad loudspeaker of claim 1 may be tuned for resonance at less than 400 Hz.

The touch sensor may have primarily piston mode resonance for audio output from 400 Hz to 3 kHz.

The touch sensor may have primarily distributed mode resonance for audio output above 3 kHz.

Various implementations described herein further include a method of operating the haptic trackpad loudspeaker comprising driving substantially orthogonal oscillation of the touch sensor using the haptic element at frequencies less than 400 Hz to provide haptic feedback, driving piston mode substantially orthogonal oscillation of the touch sensor using the haptic element at frequencies from 400 Hz to 3 kHz to provide acoustic oscillation, and driving distributed mode substantially orthogonal oscillation of the touch sensor using the haptic element at frequencies above 3 kHz to provide acoustic oscillation.

The driving piston mode substantially orthogonal oscillation or distributed mode substantially orthogonal oscillation of the touch sensor may selectively output audio notifications of a status of the haptic trackpad loudspeaker.

The audio notifications may include an indication of one or more of battery state of charge, wireless signal strength, physical proximity of the haptic trackpad loudspeaker, and accessibility features.

Various implementations described herein further include a mobile computing device comprising the device chassis including a centrally located recess; a left channel speaker; a right channel speaker; and the haptic trackpad loudspeaker to function as a center channel speaker.

The mobile computing device may further comprise a left-rear channel speaker and a right-rear channel speaker, wherein the left channel speaker is a left-front channel speaker, the right channel speaker is a right-front channel speaker, and the haptic trackpad loudspeaker functions as a center-front channel speaker.

The above specification, examples, and data provide a complete description of the structure and use of exemplary embodiments of the presently disclosed technology. Since many embodiments can be made without departing from the spirit and scope of the forgoing disclosure, the scope is defined by the claims hereinafter appended and any equivalents thereto. Furthermore, structural features of the different embodiments may be combined in yet another embodiment without departing from the recited claims.

What is claimed is:

1. A multi-channel audio system comprising:
   a left channel traditional speaker;
   a right channel traditional speaker; and
   a haptic trackpad loudspeaker to function as a center channel, the haptic trackpad loudspeaker comprising:
   a printed circuit board (PCB) oriented within a recess of a device chassis, the PCB to control haptic and acoustic operation of the haptic trackpad loudspeaker;
   an array of resilient spacers spaced apart across an x-y plane of the PCB bonding a first side of the PCB to a bottom surface of the device chassis within the recess;
   a touch sensor attached to a second side opposite the first side of the PCB, the touch sensor to function as a haptic surface and a diaphragm for the haptic trackpad loudspeaker;
   a haptic element attached to the first side of the PCB within the recess and above the bottom surface of the device chassis, the haptic element to drive substantially orthogonal oscillation of the touch sensor within the recess to selectively provide haptic feedback and acoustic oscillation; and
   a flexible sealing surround bonding a perimeter of the haptic trackpad loudspeaker to the device chassis and providing a restoring force that returns the touch sensor to a neutral position absent a driving force away from the neutral position, the array of resilient spacers and the flexible sealing surround to both function as suspension for the touch sensor for producing sound from the substantially orthogonal oscillation of the touch sensor.

2. The multi-channel audio system of claim 1, functioning as a 3-channel or 5-channel audio system for a mobile computing device.

3. The multi-channel audio system of claim 1, the haptic trackpad loudspeaker to selectively output audio notifications of a status of the haptic trackpad loudspeaker.

4. The multi-channel audio system of claim 3, wherein the audio notifications include an indication of one or more of battery state of charge, wireless signal strength, physical proximity of the haptic trackpad loudspeaker, and accessibility features.

5. The multi-channel audio system of claim 1, wherein the haptic trackpad loudspeaker is a tuned spring-mass system, and the haptic element includes a linear resonance actuator.

6. The multi-channel audio system of claim 1, wherein the haptic trackpad loudspeaker is capable of audio output from 400Hz to 10kHz.

7. The multi-channel audio system of claim 1, wherein the haptic trackpad loudspeaker is capable of haptic feedback at less than 400Hz.

8. The multi-channel audio system of claim 1, wherein the haptic trackpad loudspeaker is tuned for resonance at less than 400Hz.

9. The multi-channel audio system of claim 1, wherein the touch sensor has primarily piston mode resonance for audio output from 400Hz to 3kHz.

10. The multi-channel audio system of claim 1, wherein the touch sensor has primarily distributed mode resonance for audio output above 3kHz.

11. A method of operating a multi-channel audio system comprising:

driving a left channel traditional speaker to generate sound waves;

driving a right channel traditional speaker to generate sound waves;

driving substantially orthogonal oscillation of a touch sensor using a haptic element at frequencies less than 400Hz to provide haptic feedback, the touch sensor and the haptic element being components of a haptic track-pad loudspeaker that further comprises:

a printed circuit board (PCB) oriented within a recess of a device chassis, the PCB to control haptic and acoustic operation of the haptic trackpad loud-speaker;

an array of resilient spacers spaced apart across an x-y plane of the PCB bonding a first side of the PCB to a bottom surface of the device chassis within the recess, wherein the touch sensor is attached to a second side opposite the first side of the PCB, the touch sensor to function as a haptic surface and a diaphragm for the haptic trackpad loudspeaker, and wherein the haptic element is attached to the first side of the PCB within the recess and above the bottom surface of the device chassis; and a flexible sealing surround bonding a perimeter of the haptic trackpad loudspeaker to the device chassis and providing a restoring force that returns the touch sensor to a neutral position absent a driving force away from the neutral position, the array of resilient spacers and the flexible sealing surround to both function as suspension for the touch sensor for producing sound from the substantially orthogonal oscillation of the touch sensor;

driving piston mode substantially orthogonal oscillation of the touch sensor using the haptic element at frequencies from 400Hz to 3kHz to provide acoustic oscillation; and driving distributed mode substantially orthogonal oscillation of the touch sensor using the haptic element at frequencies above 3kHz to provide acoustic oscillation, the piston mode and the distributed mode orthogonal oscillation of the touch sensor to function as a center channel.

12. The method of operating the haptic trackpad loudspeaker of claim 11, wherein driving piston mode substantially orthogonal oscillation or distributed mode substantially orthogonal oscillation of the touch sensor selectively outputs audio notifications of a status of the haptic trackpad loudspeaker.

13. The method of operating the haptic trackpad loudspeaker of claim 12, wherein the audio notifications include an indication of one or more of battery state of charge, wireless signal strength, physical proximity of the haptic trackpad loudspeaker, and accessibility features.

14. A mobile computing device having a multi-channel audio system comprising:

a device chassis including a centrally located recess;

a left channel traditional speaker located on a left side of a display or keyboard of the mobile computing device;

a right channel traditional speaker located on a left side of the display or keyboard of the mobile computing device; and a centrally located haptic trackpad loudspeaker to function as a center channel, the haptic trackpad loud-speaker comprising:

a printed circuit board (PCB) oriented within the recess, the PCB to control haptic and acoustic operation of the haptic trackpad loudspeaker;

an array of resilient spacers spaced apart across an x-y plane of the PCB bonding a first side of the PCB to a bottom surface of the device chassis within the recess;

a touch sensor attached to a second side opposite the first side of the PCB, the touch sensor to function as a haptic surface and a diaphragm for the haptic trackpad loudspeaker; and a haptic element attached to the first side of the PCB within the recess and above the bottom surface of the device chassis, the haptic element to drive substantially orthogonal oscillation of the touch sensor within the recess to selectively provide haptic feedback and acoustic oscillation;

a flexible sealing surround bonding a perimeter of the haptic trackpad loudspeaker to the device chassis and providing a restoring force that returns the touch sensor to a neutral position absent a driving force away from the neutral position, the array of resilient spacers and the flexible sealing surround to both function as suspension for the touch sensor for producing sound from the substantially orthogonal oscillation of the touch sensor.

15. The mobile computing device of claim 14, further comprising:

a left-rear channel traditional speaker; and a right-rear channel traditional speaker, wherein:

the left channel traditional speaker is a left-front channel;

the right channel traditional speaker is a right-front channel; and the haptic trackpad loudspeaker functions as a center-front channel.

16. The mobile computing device of claim 14, wherein the haptic trackpad loudspeaker further functions to selectively output audio notifications of a status of the mobile computing device.

17. The mobile computing device of claim 16, wherein the audio notifications include an indication of one or more of battery state of charge, wireless signal strength, physical proximity of the mobile computing device, and accessibility features.

18. The mobile computing device of claim 14, capable of haptic feedback at less than 400Hz.

19. The mobile computing device of claim 14, wherein the touch sensor has primarily piston mode resonance for audio output from 400Hz to 3kHz.

20. The mobile computing device of claim 14, wherein the touch sensor has primarily distributed mode resonance for audio output above 3kHz.

* * * * *